(12) United States Patent
Abraham et al.

(10) Patent No.: US 10,809,680 B2
(45) Date of Patent: Oct. 20, 2020

(54) MOTORIZED DEVICE FOR OPERATING A WINDOW COVERING

(71) Applicant: Teptron AB, Varberg (SE)

(72) Inventors: Christofer Abraham, Varberg (SE); Alexander Abraham, Sundbyberg (SE); Tobias Björk, Varberg (SE)

(73) Assignee: Teptron AB, Varberg (SE)

( * ) Notice: Subject to any disclaimer, the term of this patent is extended or adjusted under 35 U.S.C. 154(b) by 0 days.

(21) Appl. No.: 15/905,389

(22) Filed: Feb. 26, 2018

(65) Prior Publication Data

US 2019/0265658 A1    Aug. 29, 2019

(51) Int. Cl.
*G05B 15/02* (2006.01)
*E06B 9/42* (2006.01)
*E06B 9/322* (2006.01)
*E06B 9/74* (2006.01)
*E06B 9/68* (2006.01)

(52) U.S. Cl.
CPC .............. *G05B 15/02* (2013.01); *E06B 9/322* (2013.01); *E06B 9/42* (2013.01); *E06B 9/74* (2013.01); *E06B 2009/6809* (2013.01); *E06B 2009/6818* (2013.01); *E06B 2009/6827* (2013.01)

(58) Field of Classification Search
CPC ................... G05B 15/02; E06B 9/42
See application file for complete search history.

(56) References Cited

U.S. PATENT DOCUMENTS

| 10,223,427 | B1 * | 3/2019 | Dorner | G06F 16/5838 |
| 2014/0282770 | A1 * | 9/2014 | McKinley | H04N 21/23116 725/94 |
| 2015/0331711 | A1 * | 11/2015 | Huang | G06F 3/0481 719/320 |
| 2017/0095103 | A1 * | 4/2017 | Pham | A47H 5/0325 |
| 2017/0260807 | A1 * | 9/2017 | Pham | E06B 9/74 |

* cited by examiner

*Primary Examiner* — Thomas C Lee
*Assistant Examiner* — Charles Cai
(74) *Attorney, Agent, or Firm* — BakerHostetler

(57) ABSTRACT

A control device, kit, and method is disclosed that control operation of a window covering. The control device, kit, and method use a controller. The controller is configured to, in response to an input from the at least one sensor and one or more additional inputs, a) create a ranking of preferences based on the inputs, b) select one or more preferences from the ranking of preferences, and c) actuate the motor to rotate the rotatable adapter based on the selected one or more preferences obtained from ranking of preferences, such that 1) when the rotatable adapter is engaged with the cord of the window covering and 2) the motor rotates, the window covering moves between a first configuration and a second configuration that is different than the first configuration.

28 Claims, 12 Drawing Sheets

MOTORIZED DEVICE FOR OPERATING A WINDOW COVERING

TECHNICAL FIELD

The present disclosure generally relates to devices and methods of operating window coverings. Particularly, the disclosure is directed to automatic control of window coverings in response to one or more inputs.

BACKGROUND

Window coverings, such as blinds, shades, and curtains, serve an important purpose in modern residential and business buildings. Such coverings can be used to cover windows and other see-through panels to decrease the amount of light that passes through. This can improve visibility inside a room, as well as help regulate temperature. The coverings also provide a layer of privacy by adding an opaque or semi-translucent layer to an otherwise see-through window. On the other hand, coverings may be removed or opened to allow light to enter or to increase visibility through the windows. It is advantageous to adjust window coverings in response to the outside environment and other factors. However, it is difficult to automate the coverings in response to environmental conditions and/or user preference in an efficient manner.

SUMMARY

Disclosed are methods and devices for controlling a window covering. An embodiment is a control device configured to control operation of a window covering. The control device includes a housing having an external surface, an internal surface, and an internal space defined by the internal surface. The control device includes a rotatable adapter carried by the housing. The rotatable adapter is configured to engage a cord of the window covering. The control device may also include a motor operably coupled to the rotatable adapter and being contained within the internal space. The motor is configured to cause the rotatable adapter to rotate. The control device may also include at least one sensor and a controller. The controller is configured to, in response to an input from the at least one sensor and one or more additional inputs, a) create a ranking of preferences based on the inputs, b) select one or more preferences from the ranking of preferences, and c) actuate the motor to rotate the rotatable adapter based on the selected one or more preferences obtained from ranking of preferences, such that 1) when the rotatable adapter is engaged with the cord of the window covering and 2) the motor rotates, the window covering moves between a first configuration and a second configuration that is different than the first configuration.

Another embodiment is a kit for operating a window covering. The kit includes a control device. The control device includes a housing having an external surface, an internal surface, and an internal space defined by the internal surface. The control device includes a rotatable adapter carried by the housing. The rotatable adapter is configured to engage a cord of the window covering. The control device includes an adapter receptacle carried by the housing. The control device may also include a motor operably coupled to the rotatable adapter and being contained within the internal space. The motor is configured to cause the rotatable adapter to rotate. The control device may also include at least one sensor and a controller. The controller is configured to, in response to an input from the at least one sensor and one or more additional inputs, a) create a ranking of preferences based on the inputs, b) select one or more preferences from the ranking of preferences, and c) actuate the motor to rotate the rotatable adapter based on the selected one or more preferences obtained from the ranking of preferences, such that 1) when the rotatable adapter is engaged with the cord of the window covering and 2) the motor rotates, the window covering moves between a first configuration and a second configuration that is different than the first configuration. The kit also includes a plurality of rotatable adapters. Each of the rotatable adapters is configured to engage a cord of the window covering. The plurality of rotatable adapters are configured to interchangeably engage with the adapter receptacle.

Another embodiment is a method of adjusting the configuration of a window covering for a window. The method includes receiving inputs from a control device comprising a) a housing, an internal surface, and an internal space defined by the internal surface, b) a rotatable adapter carried by the housing, c) a motor operably coupled to the rotatable adapter and being contained within the internal space, d) at least one sensor, and e) a controller. The method includes ranking of preferences based on the inputs and selecting one or more preferences from the ranking of preferences. The method includes actuating the motor based on the selected one or more preferences obtained from ranking of preferences, such that, the window covering transitions from a first configuration to a second configuration that is different than the first configuration.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. Furthermore, the drawings are not necessarily drawn to scale. In the drawings.

DETAILED DESCRIPTION OF ILLUSTRATIVE EMBODIMENTS

Embodiments of the present disclosure includes systems, devices, and methods for controlling operation of window coverings. The systems, devices, and methods are suitable for use in controlling operation of installed window coverings with one or more control devices and automation applications as further described below. The systems, devices, and methods as described herein are suitable for a wide range of cord-operated window coverings, including, but not limited to blinds, shades, or any other type of window covering type where a user can open or close the window covering via operation of a cord.

Figure 1:
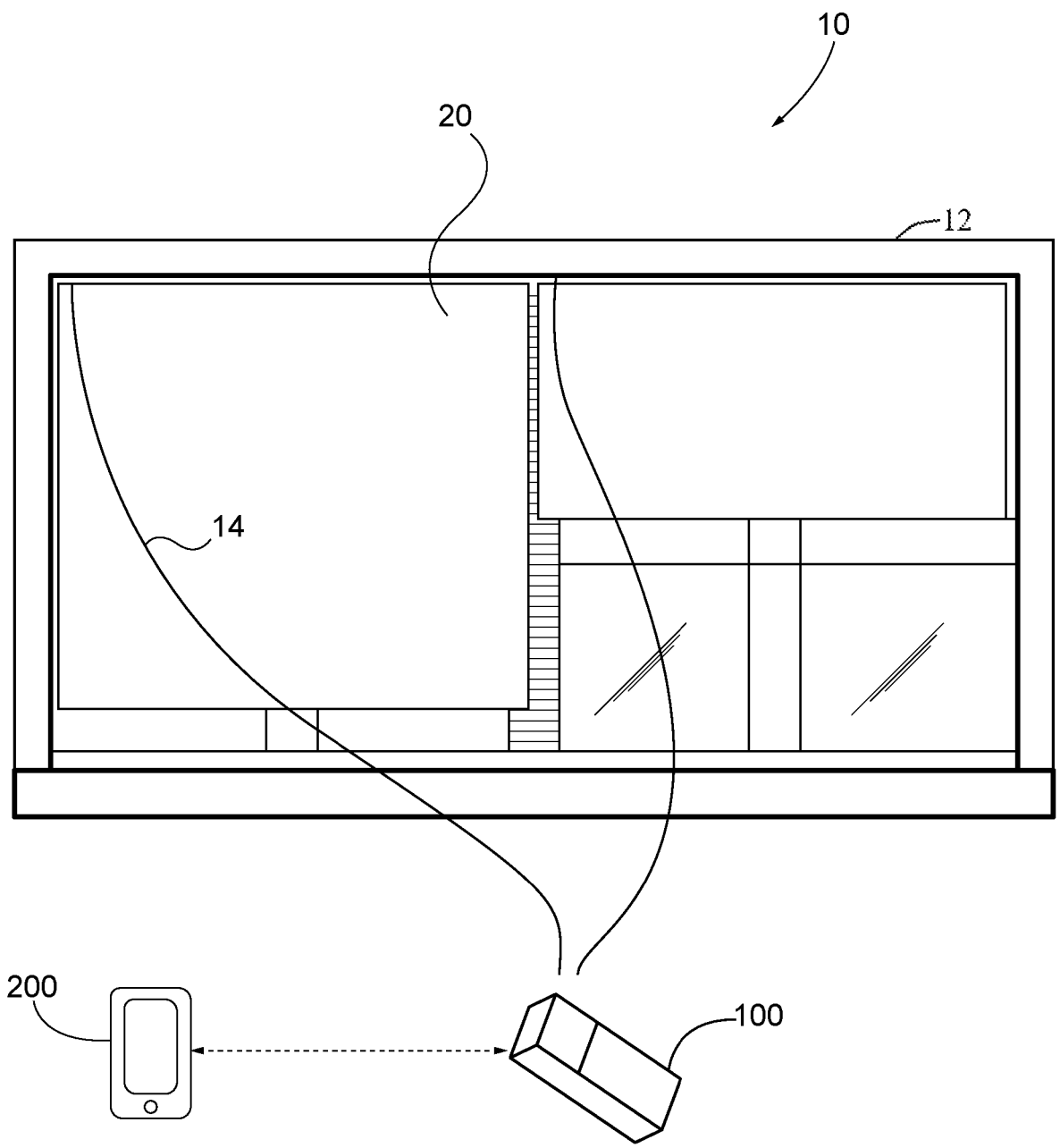
FIG. 1 illustrates a system for controlling a window according to an embodiment of the present disclosure.
Figure 2:
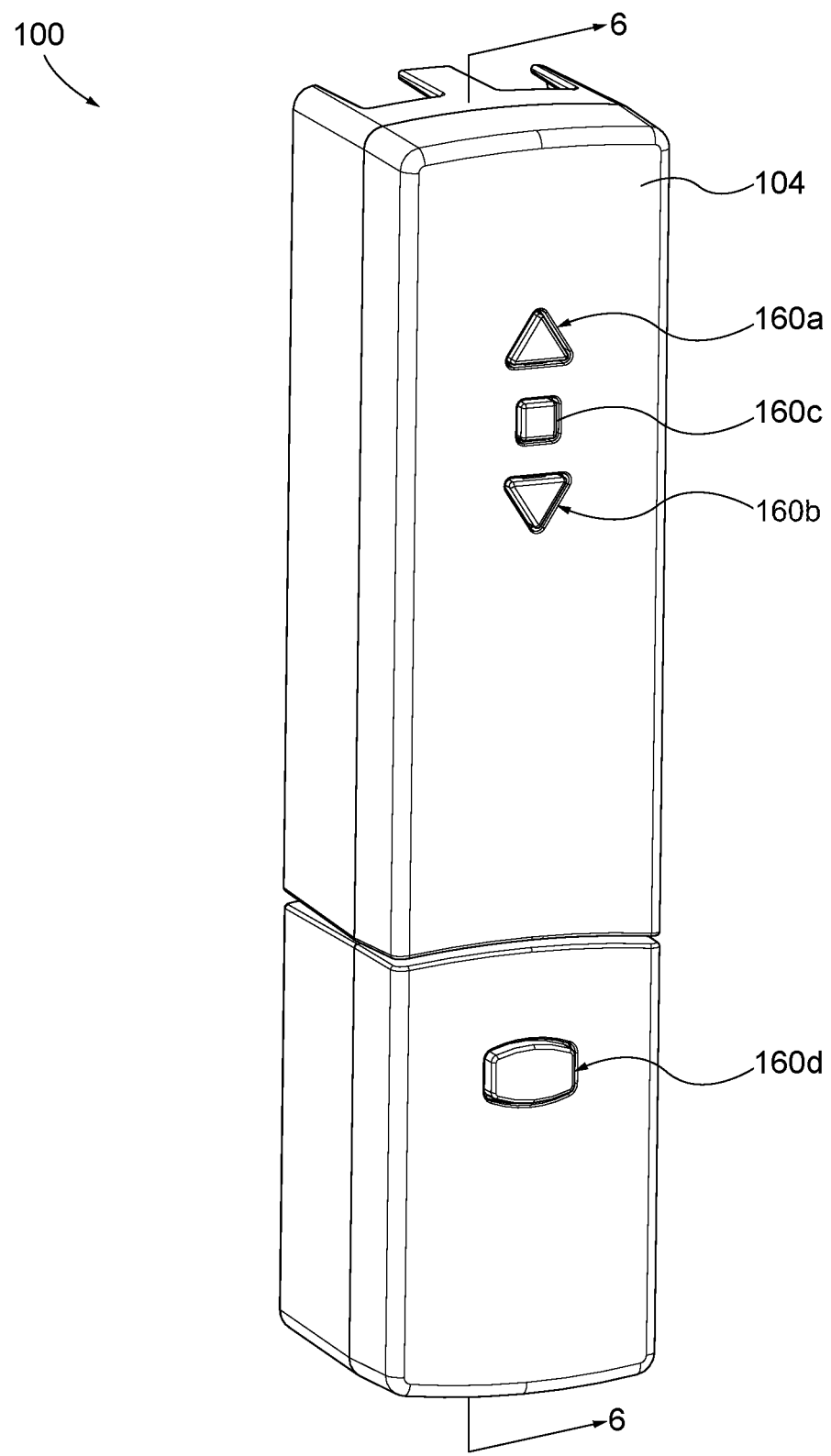
FIG. 2 is a perspective view of a control device used to control the window covering in FIG. 1.

Referring to FIG. 1, a system 10 includes at least one window covering 20 operable to cover a window 12, one or more control devices 100 for controlling operation of the window covering(s) 20, and, optionally, a computing device 200 that may be used to control the control device 100. The control device 100 may be attached to a cord 14 of the window covering 20. Operation of the control device 100 when engaged with the cord causes the window covering 20 to move. The control device 100 may be operated manually to open or close the window covering. Alternatively, the control device 100 may operate in response to inputs received from the computing device 200 to open or close the window covering. In some systems, one or more control devices 100 may operate multiple window coverings 20.

Referring now to FIGS. 2-6, the control device 100 for operating a window covering 20 (FIG. 1) includes a housing 104, a motor 124 (FIG. 6) contained within the housing 104, and a rotatable adapter 120 (FIG. 3) operably coupled to the motor 124. The rotatable adapter 120 can attach to the cord 14 (FIG. 1). The control device 100 also includes a controller 132 that may be used to operate the motor 124. The controller 132, in response to the inputs, causes the motor 124 to rotate the rotatable adapter 120. Rotation of the rotatable adapter 120, when the rotatable adapter 120 is engaged with the cord 14, opens (or closes) the window covering 20. Furthermore, the control device 100 includes one or more sensors 190 (FIG. 8) configured to obtain input data, such as, for example, light intensity and/or temperature. In some cases, the controller 132 operates the control device 100 in response to the input data.

Continuing with FIGS. 2-6, the housing 104 contains various components of the control device 100. As shown, the housing 104 has a wall 106 that defines an external surface 108, an internal surface 112, and an internal space 116. The internal space 116 may include multiple chambers sized to house different components. For example, the housing 104 may have a first chamber 118a sized to hold a power source 136, a second chamber 118b sized to hold the motor 124, and a third chamber 118c for carrying the rotatable adapter 120. The external surface 108 may define a generally rectilinear shape having a size suitable to fit in the hand of a user. For instance, the housing 104 may be prismatic or ovoid in shape, or it may have another suitable shape. The housing 104 may be comprised of plastic and/or metallic materials. In one example, the housing 104 is comprised of injection-molded components.

Figure 3:
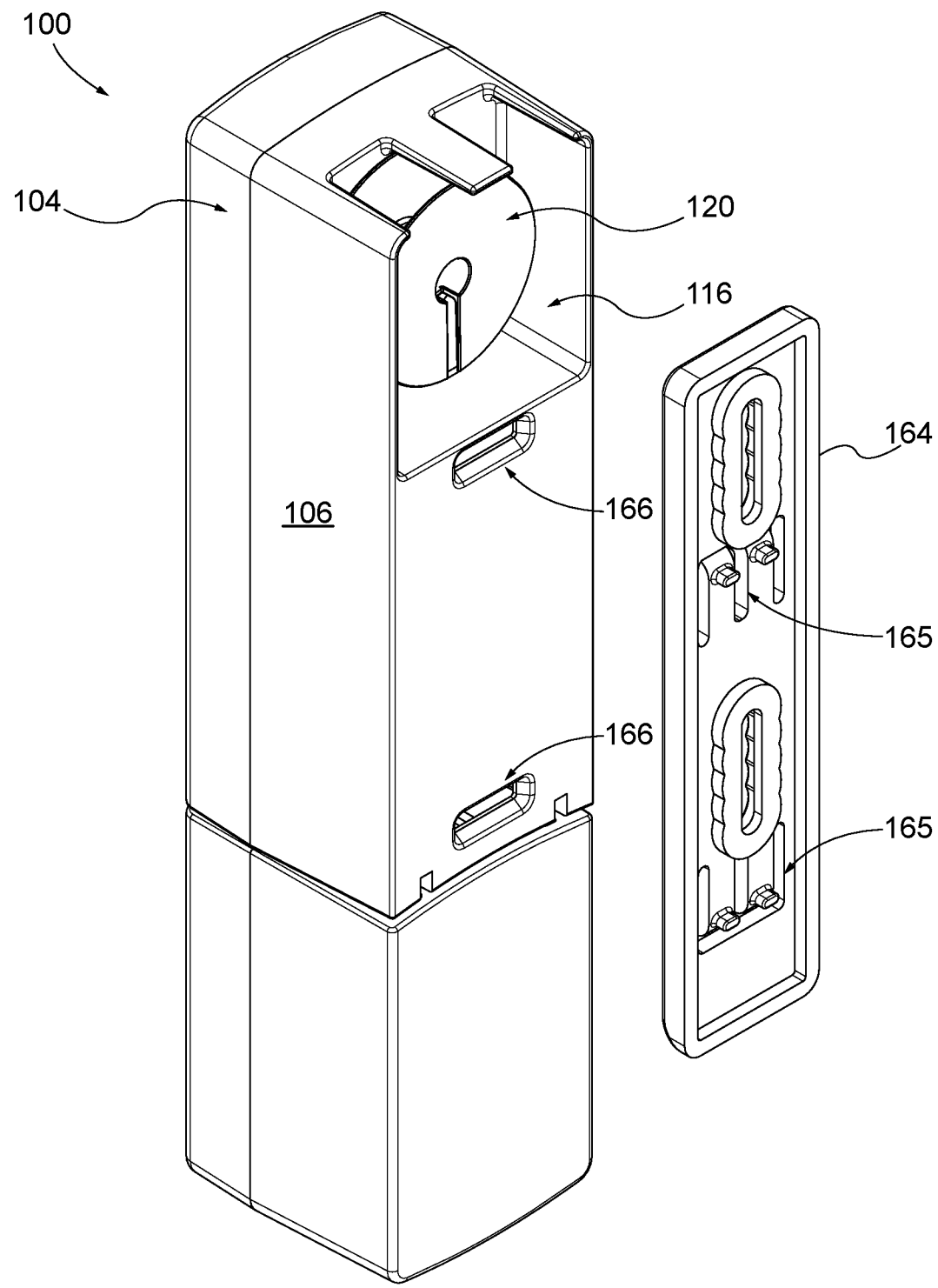
FIG. 3 is a perspective exploded view of the control device of FIG. 2.
Figure 4:
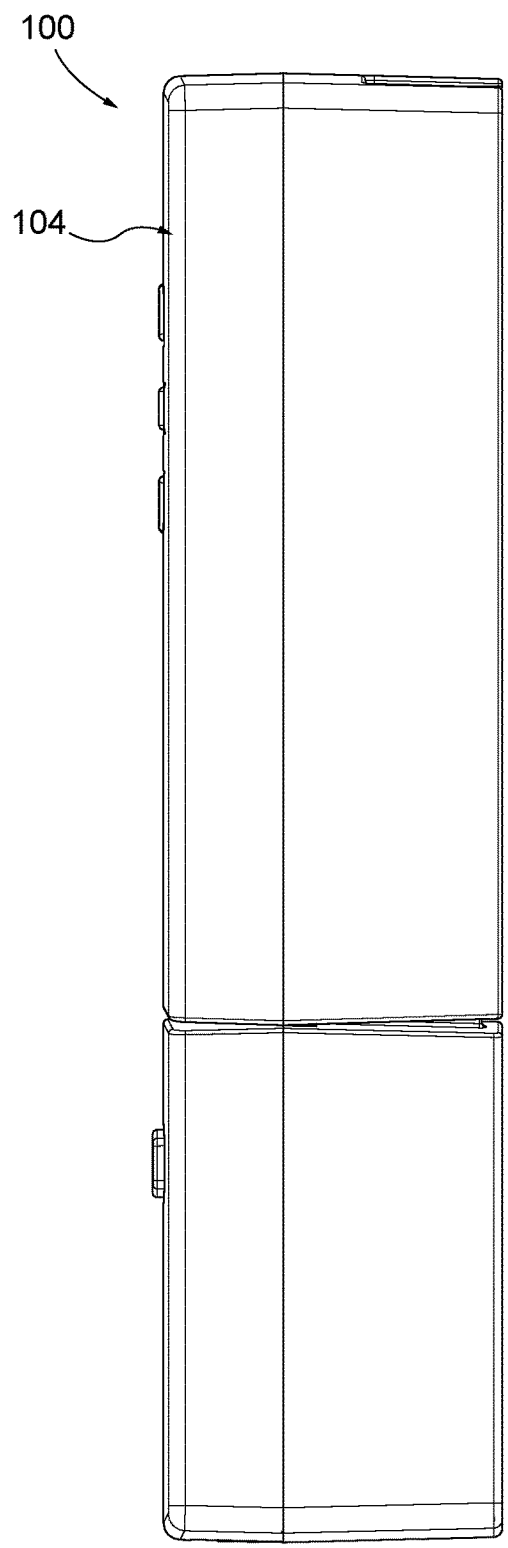
FIG. 4 is a side view of the control device shown in FIG. 2.
Figure 5:
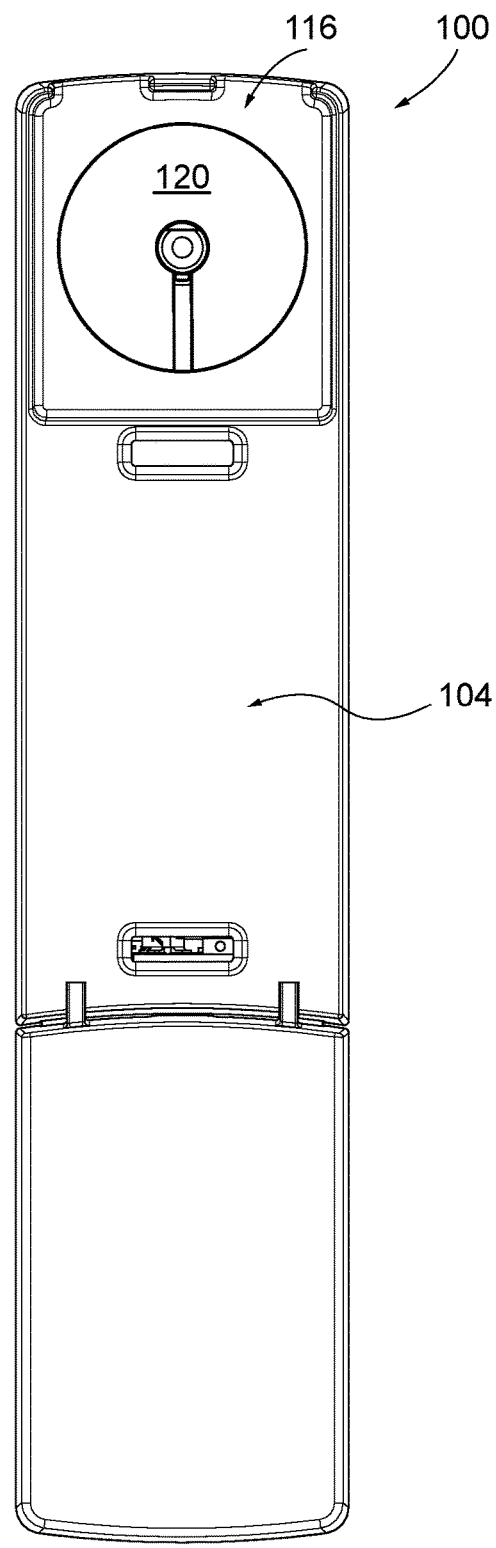
FIG. 5 is a front view of the control device shown in FIG. 2, with a portion of the device removed for illustrative purposes.
Figure 6:
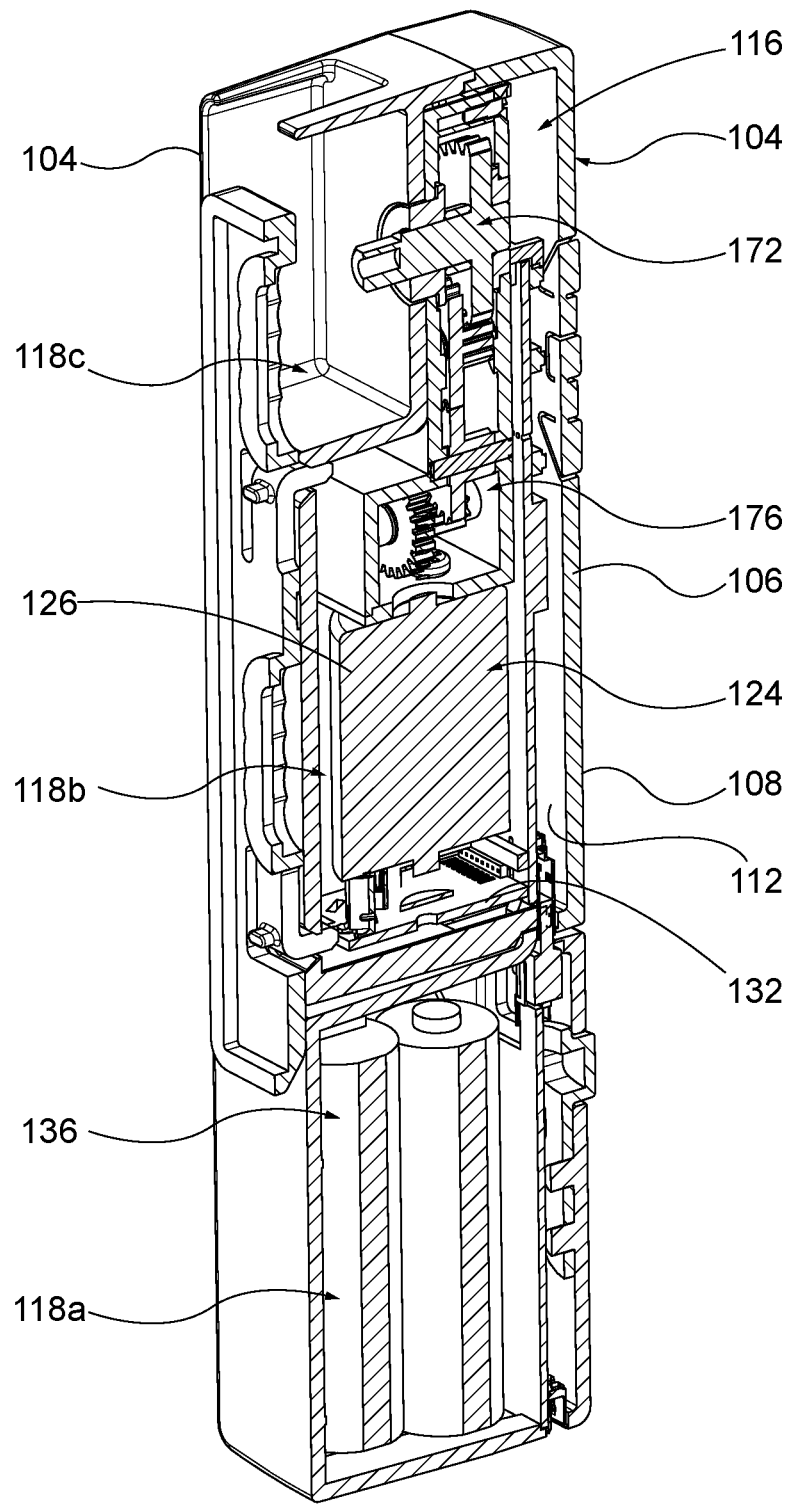
FIG. 6 is a cross-sectional view of a control device taken along line 6-6 in FIG. 2.

The control device 100 may include a clip 164 coupled to the housing 104, as shown in FIGS. 3 and 6. The clip 164 at least partially encloses the internal space 116 that contains the adapter 120. The clip 164 may be movably attached to the housing 104 so that the internal space 116 may be accessed, as shown in FIG. 3. As depicted, the clip 164 includes one or more protrusions 165 that engage with one or more recess portions 166 on the housing 104 to secure the clip 164 in place in a closed configuration. In alternative embodiments, however, the clip 164 may be attached via a hinge (not shown) such that the clip 164 is rotatable to open or close the housing 104. In another embodiment, the clip 164 may have one or more rails (not shown) to slidably engage one or more channels (not shown). In such an embodiment, the clip 164 can slidably translate between open and closed configurations.

Continuing with FIGS. 2-6, the control device 100 includes a motor 124 contained within the housing 104. The motor 124 includes a motor body 126 and a coupling mechanism 176 having one end or portion operably attached to the motor body 126. The other end of the coupling mechanism 176 engages an attachment member 172, which may be coupled to the rotatable adapter 120, as explained further below. The coupling mechanism 176 may be a set of gears or other devices that transform power from the motor 124 to rotational movement of the attachment member 172. In one example, the attachment member 172 may be in the form of a post or cylindrical member. Operation of the motor 124 causes the coupling mechanism 176 to rotate the attachment member 172, which, in turn, causes the rotatable adapter 120 to rotate. The motor 124 is a bidirectional motor, such that the coupling mechanism 176 can rotate in a first rotational direction or a second rotational direction that is opposite to the first rotational direction. The motor 124 may be configured to operate at a constant rotational speed. In other embodiments, the motor 124 may be configured to operate at variable speeds. It will be understood that the parameters of the motor may be adjusted to accommodate specific window coverings, and the particular motor specifications disclosed herein are not intended to limit the scope of the disclosure.

Figure 7A:
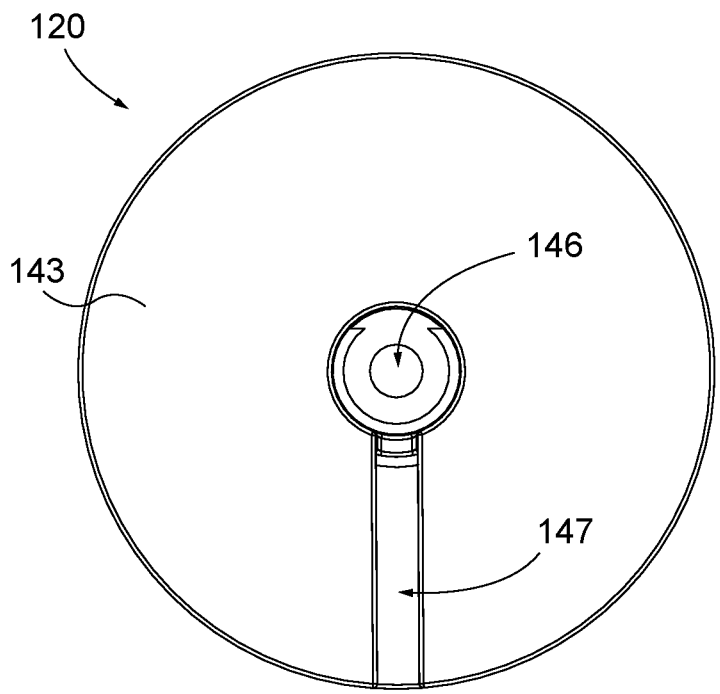
FIG. 7A is a front view of a rotatable adaptor shown in FIGS. 2-6.
Figure 7B:
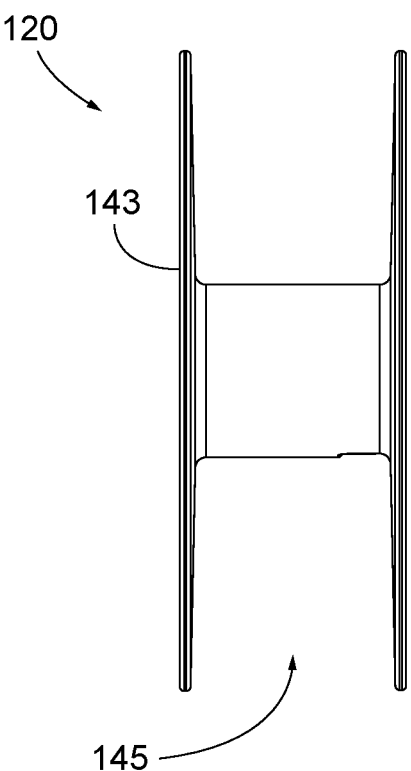
FIG. 7B is a side view of a rotatable adaptor shown in FIG. 7A.
Figure 7C:
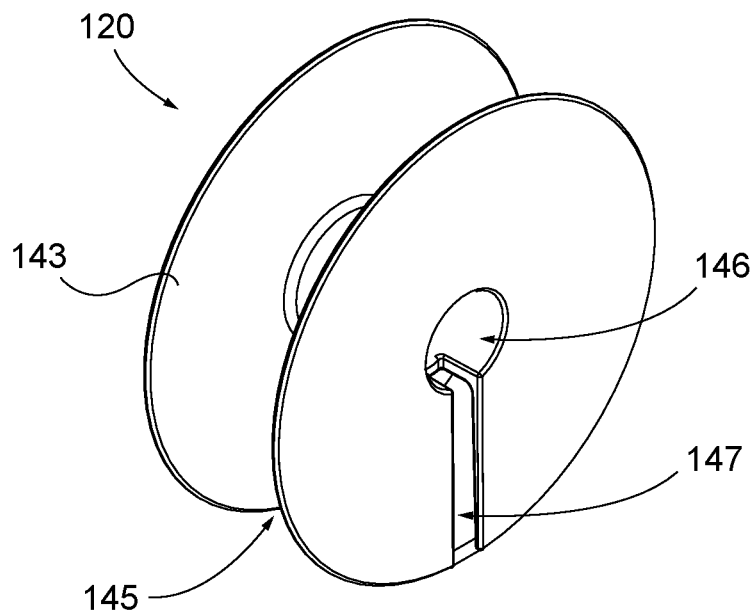
FIG. 7C is a perspective view of a rotatable adaptor shown in FIG. 7A.

Continuing with FIGS. 2-6, the rotatable adapter 120 couples the cord 14 to the control device 100. The rotatable adapter 120 is configured to, in response to operation of the motor 124, rotate in the first rotational direction or the second rotational direction based on control signals transmitted to the motor 124 from the controller 132, as will be further explained below. The rotatable adapter 120 may be removably attached to the housing 104 via the attachment member 172 that extends from the housing. As depicted in FIGS. 7A-7C, the rotatable adapter 120 may have a body 143 forming a spool 145 and a bore 146 extending therethrough. The spool 145 includes a slot 147 that receives and holds the cord 14 therein. When the cord 14 is attached in the slot 147, rotation of the adapter 120 winds the cord 14 around the spool 145, pulling the cord 14 to cause the window covering to open (or close). When adapter 120 rotates in the opposite direction, the cord 14 is unwound causing the window covering to close (or open). Other designs for engaging the cord 14 are described further below.

The rotatable adapter 120 is removably attached to the control device 100. As depicted, the bore 146 is dimensioned such that it may slidably receive the attachment member 172 into it. The attachment member 172 may include one or more engagement features that can couple to a corresponding engagement features located in the bore 146 of the adapter body 143. Thus, the rotatable adapter 120 may be secured on the attachment member 172 when the engagement features of the attachment member 172 are aligned with the engagement features in the bore 146. The engagement features, whether on the attachment member 172 or on the adapter 120, may include ridges and/or projections and corresponding shaped grooves and/or recesses. The engagement features permit removal of the rotatable adapter 120 from the control device by sliding the adapter body 143 off the attachment member 172. Furthermore, the engagement features, when coupled to each other, prevent the inadvertent removal of the rotatable adapter 120 from the control device 100. In other embodiments, however, a mechanical fastener, such as a screw, may attach the adapter 120 to the control device 100.

Different cords exist for operating window coverings. Some window coverings are operated by a loop cord, which is pulled in one direction to raise the window covering and in a second, opposite, direction to lower the window covering. Alternatively, the window covering may include a single cord that is pulled in one direction to lower the window covering and released to allow it to move in a second, opposite direction to raise the window covering. The cords may be braids, chains, or other types of elongated elements. Embodiments of the present disclosure include different rotatable adapters designed for different cord types. Thus, a user can change out the adapter based on the cord type. Described next are different types of rotatable adapters. In one example, a loop cords comprises a non-uniform cord that that has a plurality of peaks and troughs along the length of the cord. In such an example, the rotatable adapter 120 may include a plurality of posts disposed radially around the body, each post being configured to engage a recess between two peaks along the cord. As the rotatable adapter 120 rotates in the first rotational direction, the post engages a recess on the cord 14 and exerts a force on a peak, which results in a tensile force on the cord 14 and pulls the cord 14 in a first direction. When the rotatable adapter 120 is rotated in the second rotational direction, the post exerts a force on the opposite peak comprising the recess, thus resulting in a tensile force on the cord 14 that pulls the cord 14 in a second direction opposite the first direction. As the rotatable adapter 120 rotates, the post that is engaged with the recess disengages from the recess, and the next adjacent post engages with the next adjacent recess.

In another example, the rotatable adapter 120 may be configured to engage with a loop cord. In such an example, the rotatable adapter 120 may include a body and a plurality of fingers extending radially from the body. The plurality of fingers may be disposed such that the cord fits between at least two adjacent fingers. As the rotatable adapter 120 rotates, the cord is wedged between the adjacent fingers and is kept substantially in place via a frictional interaction between the cord and the fingers. As the rotatable adapter 120 rotates, the fingers in contact with the cord release contact with the cord, and another finger positioned radially around the body contacts the cord.

Referring to FIGS. 2-6, the control device 100 may also include a power source 136. The power source 136 may be a battery or a power connector that connects the control device 100 with an external electrical source, such as a wall outlet, and/or a solar panel. Any acceptable battery may be used, for example, but not limited to, sizes A, AA, AAA, AAAA, C, D, 9 volt, A23, and CR2032. The battery may be disposable or be configured to be recharged multiple times. In some aspects, a Lithium-ion 18650 battery may be implemented. The battery may be removable from the control device 100. In some aspects, a battery release mechanism 160d may be included on the housing 104 and be configured to allow the battery to detach from the housing 104 and be removed from the control device 100.

The power connector can connect the control device 100 with an external electrical source, such as a wall outlet. The solar panel may be a photovoltaic panel that generates power in response to exposure to sunlight. In some embodiments, the control device 100 can receive power from either the battery, the power connector, the solar panel, or some combination of all three source types.

Figure 8:
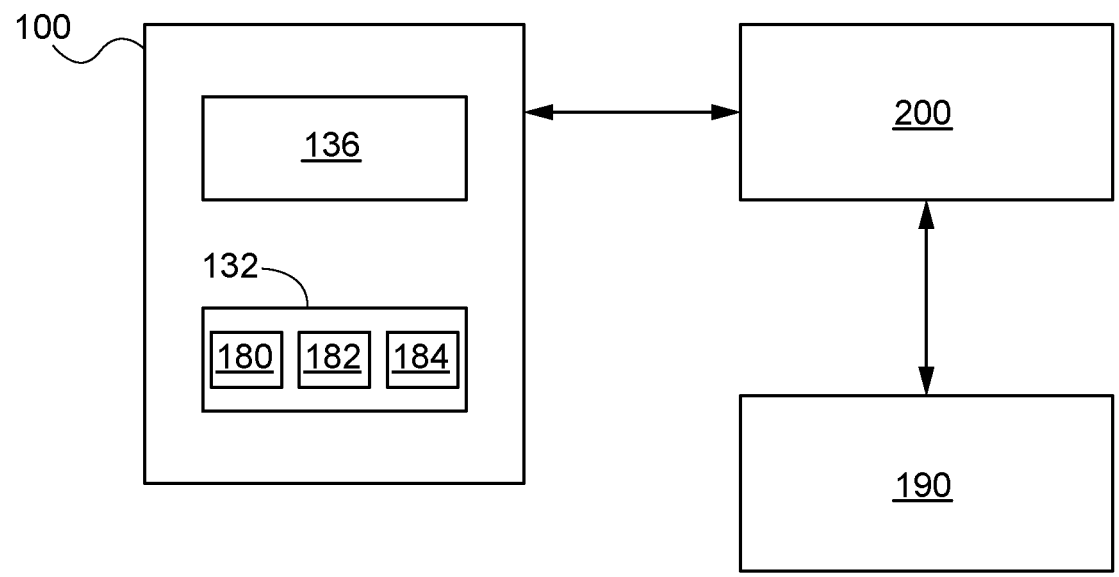
FIG. 8 is a block diagram of a control system used to control operation of the window covering according to an embodiment of the present disclosure.

Referring to FIGS. 6 and 8, the controller 132 is configured to control operation of the motor 124. The controller 132 includes one or more processors 180, memory 182, and a communications module 184. The processors 180 can execute command instructions stored in the memory 182 and/or received via inputs. The processors 180 can also send control signals to the motor 124. The communications module 184 may be communicatively coupled to the input members 160a-160c (FIG. 2) disposed on the housing 104, one or more sensors 190, and, optionally, the computing device 200. The controller 132 may use hard wires or operate via wireless communications, where appropriate. The communications protocol may include, but not limited to, Wi-Fi, Bluetooth, near-field communication, ZigBee, Z-Wave, and Homeplug GP. It will be understood that the communications protocol used is not limited by this disclosure, and any suitable means of wireless or wide communication may be used.

The controller actuates the motor 124 in response to inputs received from the input members 160a-160c, one or more sensors 190, and/or the computing device 200. The controller 132 can include command signals that cause the motor 124 to operate as desired. For instance, the command signal can include a command to operate in the first rotational direction, operate in the second rotational direction, change the speed of rotation, and cease operation of the motor. In some embodiments, the control device 100 may be configured to actuate the motor 124 based on a predetermined automation program. In some embodiments, a user may program operation of the controller 132.

Referring to FIGS. 2-6, the control device 100 includes input members 160a-160c that may be used to manually control operation of the control device 100. The input members may include a first input member 160a to open the window covering (or cause the adapter 120 to rotate in one direction), a second input member 160b to close the window covering (or cause the adapter 120 to rotate in a second direction), a third input member 160c to stop movement of the window covering. In some aspects, additional input members or existing input members 160a-160c may be used to power-on or power-off the control device 100. The input members 160a-160c may be pressure sensitive devices or switches coupled to the control board, which carries the controller 132. The input members 160a-160c are thus communicatively coupled to the controller 132 via traces or other typical circuitry. As depicted, the input members 160a-160c may be push-buttons.

As shown in FIG. 8, the control device 100 may include one or more sensors 190. The sensors 190 are adapted to observe and/or measure an environmental stimulus and transmit the measured data to the controller 132. For instance, the sensors 190 may include a light sensor, a temperature sensor, a motion sensor, a moisture/humidity sensor, and/or a sound sensor. Individual sensors 190 may be contained on or within the housing 104 of the control device 100. Alternatively, the sensors 190 may be separate components that communicate with the control device 100 either through a physical wire or via a wireless means of communication.

In one embodiment, a light sensor is included and is configured to detect a parameter of light. For example, the light sensor may detect the presence, intensity, and/or duration of light from a light source. The light sensor may transmit sensor data to the controller 132. The controller 132, in turn, is configured to include a sensor threshold, such that when the light sensor detects the parameter of light greater than the preset threshold, the controller 132 can cause a predetermined action to occur based on the stored command instructions. On the other hand, if the parameter of light is below the preset threshold, the light sensor does not send the command signal. Having a threshold value may be advantageous because it may reduce false positives and decrease unnecessary command signals.

The light sensor may be configured to operate in response to input data and/or control instructions. For instance, the light sensor may be configured to detect the presence or lack of a light signal that corresponds to changing light conditions, for example, sunrise and sunset or artificial lights being on or off. The light sensor may also detect a light signal when the sun is shining directly onto the light sensor. Such a setup may be advantageous because it allows for the control device 100 to control a window covering automatically when there is need to close the window covering (for example, when the sun is shining into the window) or open the window covering to allow more light.

In one alternative embodiment, the control device 100 may be configured to engage with a plurality of light sensors. For instance, the control device 100 may include a first light sensor and a second light sensor. The first light sensor may be disposed on the control device 100 such that it can detect light from a first source, and a second light sensor may be disposed elsewhere (on or off the device) such that it can detect light from a second source. For example, the first light sensor may be directed to detect light from outside of a window while the second light sensor may be directed to detect light from inside a house. In such a scenario, the control device 100 may receive command signals from the multiple sensors and actuate the motor 124 to adjust the window covering accordingly.

In another embodiment, a temperature sensor may be configured to detect ambient temperature and transmit a command signal to the control device 100. The temperature sensor may be a separate component that is configured to communicate with the controller 132 either via physical connection or wirelessly. Alternatively, the temperature sensor may be integral with the control device 100. For example, the temperature sensor may be contained within the housing 104. The control device may actuate the motor 124 in response to a command signal received from the temperature sensor. The temperature sensor may be configured to send a command signal when the temperature sensor detects a temperature that is above or below a preset temperature threshold.

In another embodiment, a motion sensor may be configured to transmit a command signal to the control device 100. The motion sensor may detect presence via a generally-acceptable motion detecting mechanism, such as passive infrared (PIR), microwave, ultrasonic, or video. The motion sensor may be a separate component that is configured to communicate with the controller 132 either via physical connection or wirelessly. Alternatively, the motion sensor may be integral with the control device 100, for example being contained within or disposed on the housing 104.

The control device 100 is configured to operate in conjunction with one or more computing devices 200. As shown in FIG. 8, the control device 100 may be in electronic communication with one or more software applications running on the computing device 200 and with one or more of the sensors 190. The computing device 200 may also be in electronic communication with one or more of the sensors 190.

As further detailed below, one or more software applications can monitor and/or control operation of the control device 100 to control position of the window covering. In such a case, it is possible to operate the control device 100 remotely in response to user inputs and/or sensor inputs into the computing device 200, as will be explained further below. The software applications may be implemented over various system components and configured to execute various steps in the methods described below. It should be appreciated that a software application can implement steps in the described methods utilizing all of the system components or just portions of the system components. Furthermore, the software applications are described below in singular form. It should be appreciated that multiple software applications may interface to perform the described functions, and multiple applications can run on more than one computing device to implement the methodologies described herein.

Figure 9:
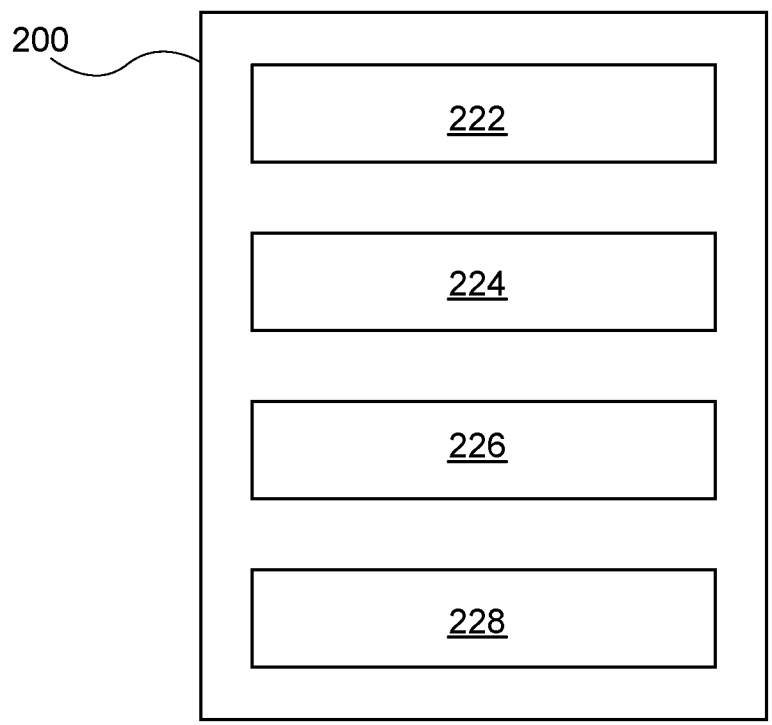
FIG. 9 is a schematic block diagram of a computer device according to an embodiment.

Continuing with reference to FIGS. 8 and 9, the control device 100 and computing device 200 are in electronic communication with each other via a common communications network. In some instance, an additional computing device may be used in the form of a server computing device. In such a case, the control device 100, computing device 200, and server computing device (not shown) may be arranged in a client-server architecture. The computing device 200 can receive and transmit data to the server computing device via the communications network. In addition, the computing device 200 can receive information from the other computing devices. Furthermore, the computing device 200 can access information on the server or other computing devices. "Access" or "accessing" as used herein can include retrieving information stored in memory on a computing device. For instance, "access" or "accessing" includes sending instructions via the network from server computing device to computing device 200 so as to cause information to be transmitted to the memory of the computing device 200 for access locally by the computing device 200. In addition, or alternatively, "access" or "accessing" can include the server computing device sending an instruction to the computing device 200 to access information stored in the memory of the computing device 200. References to the server computing device and computing device 200 in this paragraph are exemplary and are used to only clarify use of words "access" or accessing."

A client-server network architecture is described above. But the software application can be implemented over any number of network configurations. For example, software application can be implemented across computing devices arranged on a network that includes aspects of a client-server network, peer-to-peer network, ring-type network, and/or other network architectures known to a person of ordinary skill in the art. Accordingly, it should be appreciated that numerous suitable alternative communication architectures are envisioned for implementing the software application on a user's computing device.

Referring to FIG. 9, the exemplary computing device 200 is shown. The computing device 200 is configured to receive, process, and store various information used to implement one or more software applications. It will be understood that the hardware components of computing device 200 can include any appropriate device, examples of which include a portable computing device, such as a laptop, tablet, smart phone, smart watch, or other computing devices, such as, a desktop computing device or a server-computing device. Suitable alternative computing devices include, for example, Amazon Echo, Google Home, Siri-enabled Apple iPhone smartphones, and Google-enabled Android smartphones.

As illustrated in FIG. 9, the computing device 200 includes one or more processors 222, a memory 224, an input/output 226, and a user interface (UI) 228. It is emphasized that the operation diagram depiction of the computing device 200 is exemplary and not intended to imply a specific implementation and/or configuration. The processor 222, memory 224, input/output portion 226 and user interface 228 can be coupled together to allow communications therebetween, and can interface with the client software application. The client software application may include an application programmatic interface (API). As should be appreciated, any of the above components may be distributed across one or more separate devices.

Continuing with FIG. 9, the memory 224 can be volatile (such as some types of RAM), non-volatile (such as ROM, flash memory, etc.), or a combination thereof, depending upon the exact configuration and type of processor 222. The computing device 200 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic storage or other magnetic storage devices, universal serial bus (USB) compatible memory, or any other medium which can be used to store information and which can be accessed by the computing device 200.

Continuing with FIG. 9, in various embodiments, the input/output portion 226 includes an antenna or an electronic connector for wired connection, or a combination thereof. In some implementations, input/output portion 226 can include a receiver and transmitter, transceiver or transmitter-receiver. The input/output portion 226 is capable of receiving and/or providing information pertaining to communication with a network such as, for example, the Internet. As should be appreciated, transmit and receive functionality may also be provided by one or more devices external to the computing device 200. For instance, the input/output portion 226 can be in electronic communication with a receiver.

Referring to FIG. 9, the user interface 228 can include an input device and/or display (input device and display not shown) that allows a user to communicate with the computing device 200. The user interface 228 can include inputs that provide the ability to control the computing device 200, via, for example, buttons, soft keys, a mouse, voice actuated controls, a touch screen, movement of the computing device 200, visual cues (e.g., moving a hand in front of a camera on the computing device 200), or the like. The user interface 228 can provide outputs, including visual displays. Other outputs can include audio information (e.g., via speaker), mechanical (e.g., via a vibrating mechanism), or a combination thereof. In various configurations, the user interface 228 can include a display, a touch screen, a keyboard, a mouse, an accelerometer, a motion detector, a speaker, a microphone, a camera, or any combination thereof. The user interface 228 can further include any suitable device for inputting biometric information, such as, for example, fingerprint information, retinal information, voice information, and/or facial characteristic information, for instance, so as to require specific biometric information for access to the computing device 200. It should be appreciated that the controller 132 may operate in response to vocal commands and may transmit a signal to the controller. It should be appreciated that the computer devices can operate via any suitable operating system, such as Android, BSD, iOS, Linux, OS X, QNX, Microsoft Windows, Windows Phone, and IBM z/OS. Furthermore, the software application can operate with any of the aforementioned operation systems.

According to another embodiment, an automation process is disclosed that may be implemented via one or more software applications described above. In some embodiments, the automation process may be performed by the controller 132 of the control device 100. Alternatively, the automation process may be performed on a separate computing device 200. In some embodiments, a portion of the automation process may be performed on the controller 132, and another portion of the automation process may be performed on a computing device 200. The controller 132 may receive one or more commands from the computing device 200, which in turn, cause the controller 132 to initiate the desired action. For instance, whether implemented on the controller 132 or the computing device 200, the software application instructs the various components of the control device 100 to operate to move a window covering in response to one or more inputs.

Figure 10:
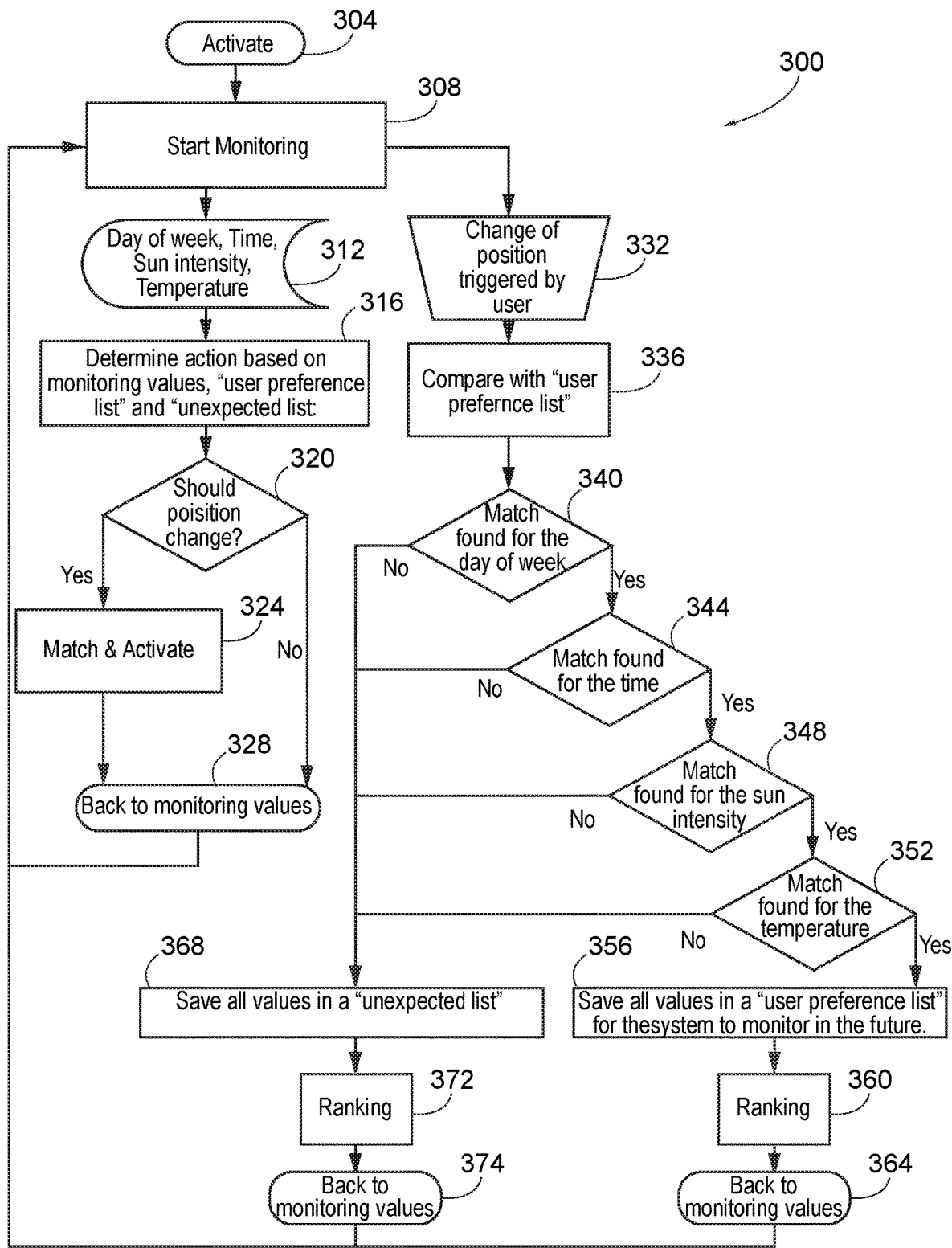
FIG. 10 is a process flow diagram illustrating a method for controlling operation of a window covering according to an embodiment of the present disclosure.

FIG. 10 illustrates a process 300 for operation of the control device 100 according to one embodiment of the present disclosure. The automation process 300 initiates in block 304. Activation may occur when a device, for example the control device 100, is turned on by the user. In some embodiments, activation may occur when a preset condition is met, for example, at a predetermined time or date. Thus, the controller 132 may include a time clock that is continuously running.

After activation, process control moves to block 308 whereby the control device 100 is monitoring for various inputs. In block 312, the control device 100 monitors various parameters. Exemplary parameters may include, but are not limited to, light exposure, light intensity, light duration, temperature, and motion. Parameters may alternatively be received from one or more sensors configured to detect and/or quantify various inputs as described above. The automation process 300 may be configured to learn a particular user's preferences. Alternatively, a user may save preferred settings for future reference. New or recurring parameters may be saved to the computer memory as user preferences. A user's actions may also be saved to the computer memory. Actions may be matched with parameters. Information saved from prior iterations of the process may be accessed, compared, and analyzed in a future iteration of the process, as described further below.

In block 316, the automation process may determine if an action is needed based on monitored parameter values, a user preference list, or an unexpected parameter list. In block 316, the software application, executed by one or more processors, compares the detected parameters based on the saved information stored in the computer memory in the controller and/or computing device. For example, if the user had previously actuated the control device to move the window closure a particular distance in response to a specific combination of parameters, then the process may compare the stored information with parameters detected in block 312. Process control is transferred to block 320.

In block 320, the processor determines if the position of the window covering should change. If the processor determines that the position of the window covering should change, then the software application saves to computer memory the change direction, time, day of week, light intensity values, and/or temperature. These values may be saved in the computer memory in the form of relational database or some other suitable data structure. Process control is transferred in block 328 back to the monitoring state in block 308. If, however, in block 320 the processor determines that the position of the window covering should not change, then process control is transferred to block 328. In block 328, the software application implements a monitoring state shown in block 308.

In block 324, the process may match detected parameters with the stored information and automatically actuate the control device based on a corresponding user action that was saved with the parameters. The automated actuation may be saved for future reference. Once the control device has been moved in response to the command, or if no matching parameters were found, then the process may revert to monitoring for a change in parameters in block 328.

In some embodiments, however, a user may actuate the control device manually. In block 332, the automation process 300 may receive a command from the user and transmit a command signal to the controller 132 to actuate the control device 100. For instance, if the user wants to manually change the position of the window covering, the user can input instructions directly on the control device 100 via input buttons 160a-160c or via the computing device 200.

In block 336, the software application compares the manual inputs with the user's preference data. Process control is transferred to block 340. In block 340, the processor determines if a match has been found for the day of the week. If a match has been found for the day of the week, process control is transferred to block 344. If no match has been found for the day of the week, process control is transferred to block 368. Block 368 will be described further below.

In block 344, the processor determines if a match has been found for the time of day. If a match has been found for the time of day, process control is transferred to block 348. If no match has been found for the time of day, process control is transferred to block 368.

In block 348, the processor determines if a match has been found for light intensity. If a match has been found for light intensity, process control is transferred to block 352. If no match has been found for the light intensity, process control is transferred to block 368.

In block 352, the processor determines if a match has been found for temperature. If a match has been found for temperature, process control is transferred to block 356. If no match has been found for temperature, process control is transferred to block 368.

Referring to blocks 340-352, the process looks for a match between the observed parameters and saved information. A match as used herein means the inputted value is within a range of saved values, dependent on the parameter. Typically, a match for the day of the week means the same day (Monday, Tuesday, etc. . . . ). For instance, an inputted time of 7:00 am may be a match with saved values between 6:50 am and 7:10 am. For light intensity, the match may be within a predetermined range, which is deemed to constitute a match.

In block 356, parameters and command signals related to the user's actuation of the control device may be stored in computer memory as user preferences in list form or other data structure. The user preference list may include information programmed by the user, preprogrammed into the process, preprogrammed into the device, or preset based on one or more additional settings of the automation process 300 and/or the control device 100. Process control is transferred to block 360.

In block 360, the processor, implementing instructions from the software application, may create a ranking of preferences in the "user preference list." This ranking may be used to automate a future actuation of the control device 100. The ranking may be generated based on the quantity and/or frequency of occurrences or based on one or more user preferences. During and/or after ranking block 360, process control is transferred to block 364. In block 364, the computer processor operates in the monitoring state, and process control is transferred back to block 308 as described above.

Referring back to blocks 340, 344, 348, and 352, if a match is not found in blocks 340, 344, 348, and 352, then the process control moves to block 368. In block 368, parameters and command signals related to the user's actuation of the control device 100 may be saved to a list of preset data that is different from the list created in block 356. This list, which may be referred to as an "unexpected list," may include information based on actuation or commands received from the user or from the control device that are not preset or defined in the process.

From block 368, process control transfers to block 372. In block 372, the processor, implementing instructions from the software application, may create a ranking of preferences in the "unexpected list." This ranking may be used to automate a future actuation of the control device. The ranking may be generated based on the quantity and/or frequency of occurrences or based on one or more user preferences. During and/or after ranking block 372, process control is transferred to block 374. In block 374, the computer processor operates in the monitoring state, and process control is transferred back to block 308 as described above.

Figure 11:
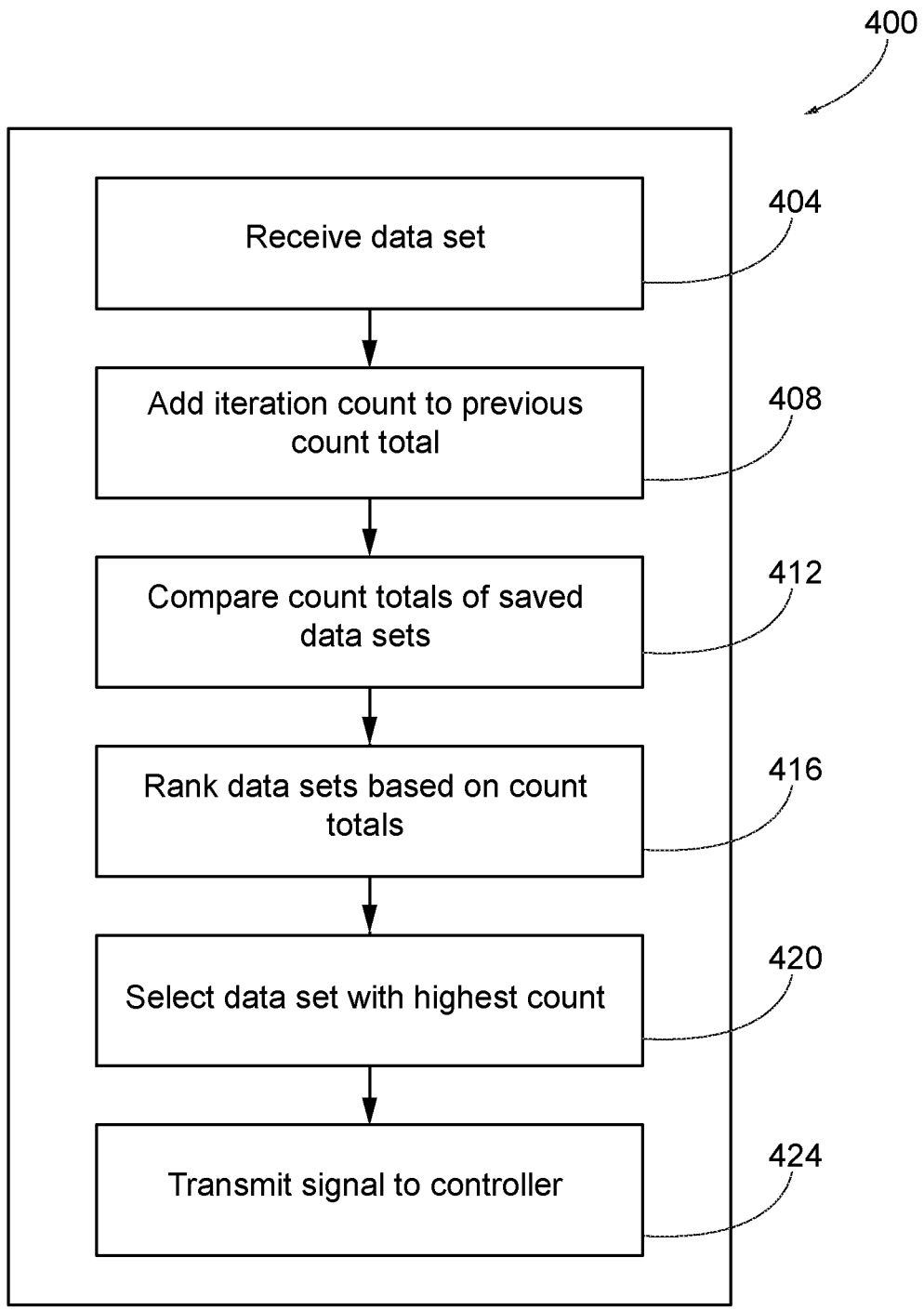
FIG. 11 is a process flow diagram illustrating a method for controlling operation of a window covering according to another embodiment of the present disclosure.

Referring to FIG. 11, a process 400 used in blocks 360 and 372 is shown in detail. In the block 404, the ranking process receives information from blocks 356 or 368 of the automation process 300. The information may include data based on one or more parameters as described throughout this application. The information may further include user-inputted commands to the control device 100. Information may be relative positional coordinates of a window covering, of the control device, or of another component configured to provide data to one or more controllers that communicate with the control device 100.

In block 408, the particular data set received in block 404 may be marked, identified, and/or numerated. For example, a numerical indicator associated with the frequency of receiving the data set may be assigned to the data set. If a data set has not been received before, it would receive a numerical count of "1" or a digital equivalent thereof. If the same data set is received in a future iteration, it will receive the next consecutive numerical count of "2" or a digital equivalent thereof. The most recent numerical count may be permanently associated with the data set until it is altered by a different count or other adjustment to the process.

In block 412, the total count of the received data set is compared to the total count of every other data set stored in the memory.

In block 416, the ranking process may rank some or all of the individual data sets in mathematical order, for example in descending numerical order. The most prevalent data sets may be ranked higher, for example, than data sets with fewer occurrences.

In block 420, the ranking process may select a data set. In some embodiments, the selected data set is the highest ranked data set.

After selecting the data set, the process moves to block 424, where the process may transmit a signal to the controller 132 to actuate the control device 100 to move a window covering.

The ranking process described above may include an interaction between one or more data directories, for example a "user preference list" and an "unexpected values list." The user preference list may include parameters that have been previously set by the user, by the manufacturer, or saved by one or more processes described throughout this specification. The unexpected values list may include parameters that do not match those in the user preference list or that otherwise do not belong in the user preference list.

When a triggering condition occurs, the controller 132 may be configured to compare the triggering condition with existing parameters in the user preference list. If the triggering condition matches existing parameters, then those existing parameters receive an increased ranking by one or more of the methods described above. If the triggering conditions do not correspond to any existing parameters in the user preference list, the triggering conditions are stored as an unexpected set of parameters in the unexpected values list.

In some embodiments, parameters in the unexpected values list may be moved from the unexpected values list to the user preference list. For instance, if future triggering conditions occur that do not correspond to any parameters in the user preference list but do match one or more of those in the unexpected values list, those values in the unexpected values list may be listed or ordered according to one or more ranking processes described above. In some embodiments, a parameter in the unexpected values list that achieves a predetermined ranking may be moved to the user preference list. This may allow the device to dynamically adjust, or "learn," as it receives continued input.

The user preference list may be configured to expand as the system 10 "learns" from one or more users. In some embodiments, the system 10 may have one or more preset values in the user preference list. With continued use, however, additional values may be added to the user preference list, existing values may be altered, and values may be removed from the list.

Figure 12:
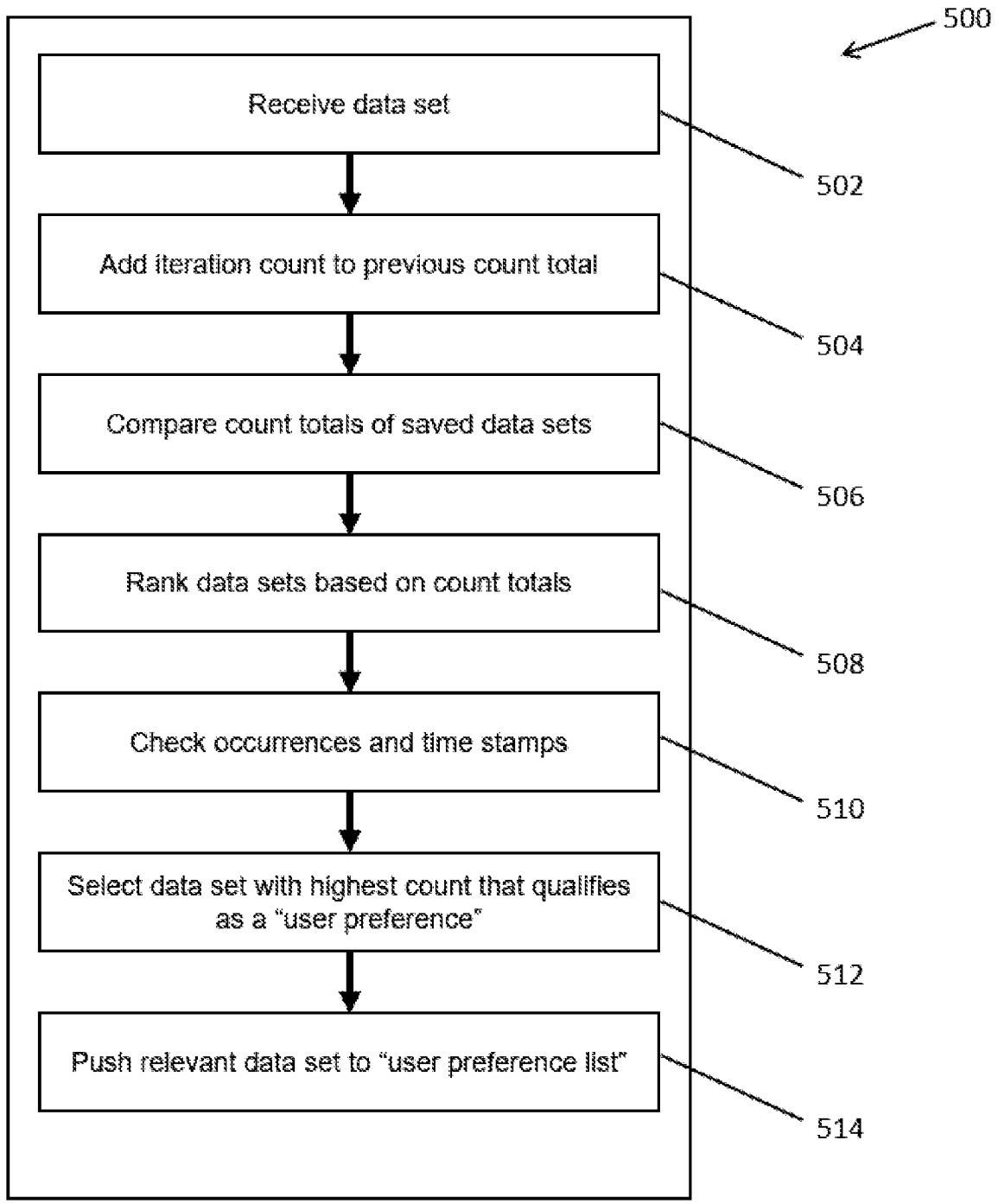
FIG. 12 is a process flow diagram illustrating a method for ranking control parameters for controlling operation of a window covering according to an embodiment of the present disclosure.

According to another embodiment, a data ranking process 500 for computing values in the "unexpected values list" is depicted in FIG. 12. In the block 502, the ranking process receives information according to one or more of the processes described throughout this specification. Information may be relative positional coordinates of a window covering, of the control device, or of another component configured to provide data to one or more controllers that communicate with the control device 100.

In block 504, the particular data set received in block 502 may be marked, identified, and/or numerated. For example, a numerical indicator associated with the frequency of receiving the data set may be assigned to the data set. If a data set has not been received before, it would receive a numerical count of "1" or a digital equivalent thereof. If the same data set is received in a future iteration, it will receive the next consecutive numerical count of "2" or a digital equivalent thereof. The most recent numerical count may be permanently associated with the data set until it is altered by a different count or other adjustment to the process.

In block 506, the total count of the received data set is compared to the total count of every other data set stored in the memory.

In block 508, the ranking process may rank some or all of the individual data sets in mathematical order, for example in descending numerical order. The most prevalent data sets may be ranked higher, for example, than data sets with fewer occurrences.

In block 510, the process may compare the ranked information based on its totals calculated in block 508 and/or on other parameters, such as when previous iterations of the same parameters occurred, whether a particular user triggered these parameters, or another data value.

In block 512, the ranking process may select a data set based on calculations performed in the previous blocks. In some embodiments, the selected data set is the highest ranked data set.

After selecting the data set, in block 514, the process may move the data set selected in block 512 to the "user preference list."

Figure 13:
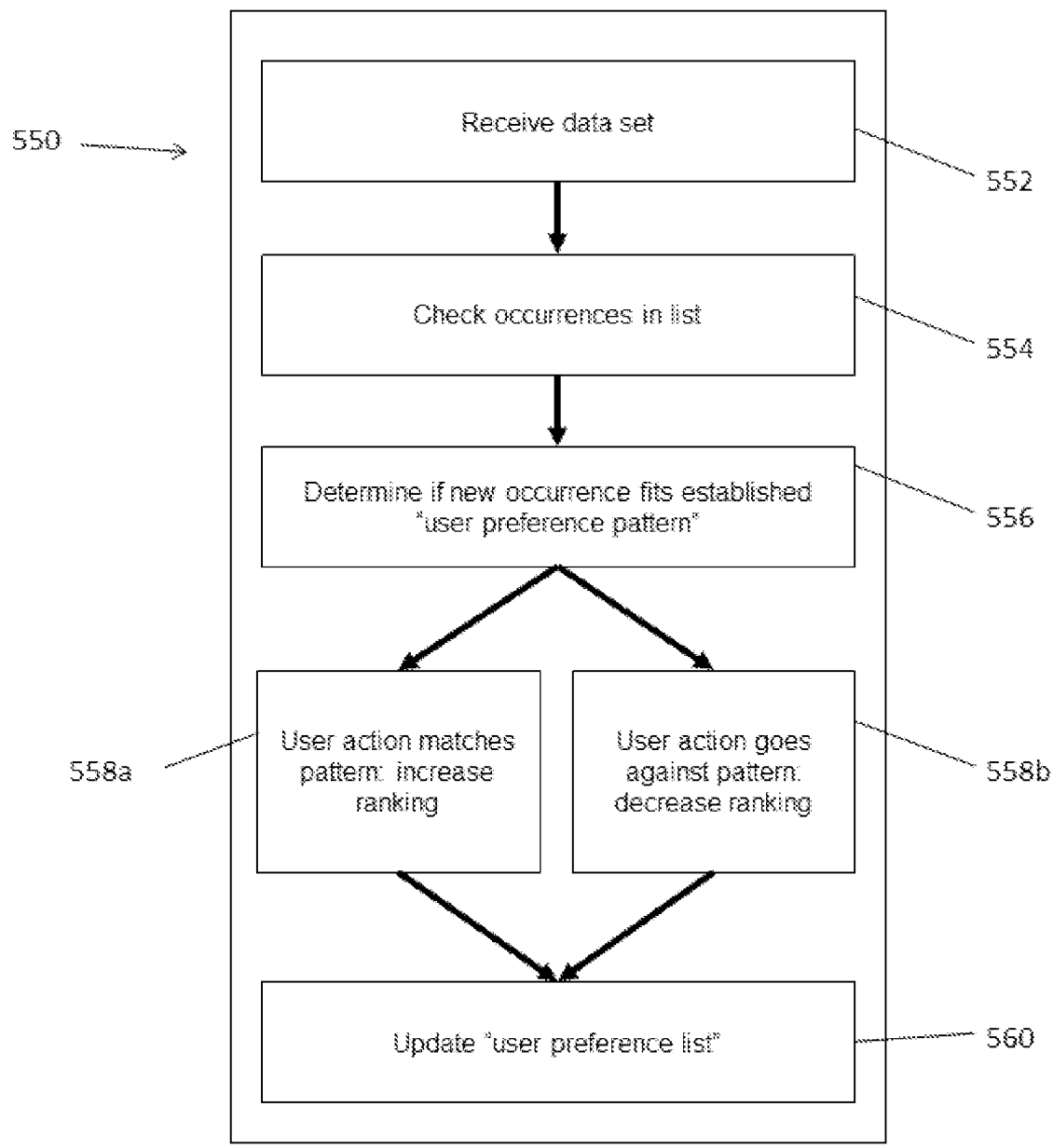
FIG. 13 is a process flow diagram illustrating a method for ranking control parameters for controlling operation of a window covering according to another embodiment of the present disclosure.

Referring to an exemplary ranking process 550 of a user preference list shown in FIG. 13, the process 550 begins in block 552, where the ranking process receives information according to one or more of the processes described throughout this specification. The information may having matching parameters to one or more existing parameters in the user preference list.

In block 554, the process compares the received information to parameters already present in the user preference list. If no match exists, the information may be moved to process 500, where it is ranked in the unexpected values list. If a match exists, the process 550 moves to block 556.

In block 556, the process 550 compares the information to one or more user preference patterns. Patterns may include, for example, previous actions by a user based on location of the control device 100, the time of day, the time of year, or another parameters that could indicate a desire to change the position of one or more window coverings.

Referring to block 558a, if the information corresponds to an existing user pattern, the ranking may be increased by one or more of the ranking methods described throughout this specification. Alternatively, referring to block 558b, if the information does not correspond to an existing user pattern, the ranking may be decreased. The process 550 then moves to block 560.

In block 560, the process 550 updates the user preference list with the updated rankings.

The system 10 may include or be configured to interact with a network. The network may be configured to connect and engage with a plurality of control devices 100 and computing devices 200. Data may be shared among one or more of the control devices 100 and/or computing devices

200. Shared data may include, for example, triggering conditions, values in the user preference list, and/or values in the unexpected values list.

Some or all control devices 100 and computing devices 200 may execute one or more processes described throughout this specification. In some embodiments, a single process may be performed by more than one control or computing device 100, 200. The shared performance may be simultaneous and may be repetitive or piecemeal. For example, a first control device 100 may perform a first portion of the process while a second control device 100 may perform a second, different, portion of the same process.

Analysis of large data sets requires computational power. When large data sets are analyzed, it may be advantageous to share the analytical process among a plurality of devices in the network to decrease the burden of each individual device. In some embodiments, where a control device 100 is configured to operate off portable power, for example a battery, the decreased processing load may result in increased battery life.

In some embodiments, the network may be configured to interact with a gateway (not shown). The gateway may be configured to complete the above processes faster and/or more efficiently. In some embodiments, the gateway may include a larger capacity portable battery. Additionally, or alternatively, the gateway may be configured to plug into or be hardwired to an electrical power source.

In some embodiments, one or more of the computing devices 200 may receive data and perform analysis on the data. The computing device 200, for example a smart phone, may have greater processing power and efficient energy consumption such that it can perform a part or the whole process and communicate the results with one or more of the devices in the network. In some embodiments, the computing device 200 includes the gateway, and a smart phone may be configured to function as a gateway as described above.

Figure 14:
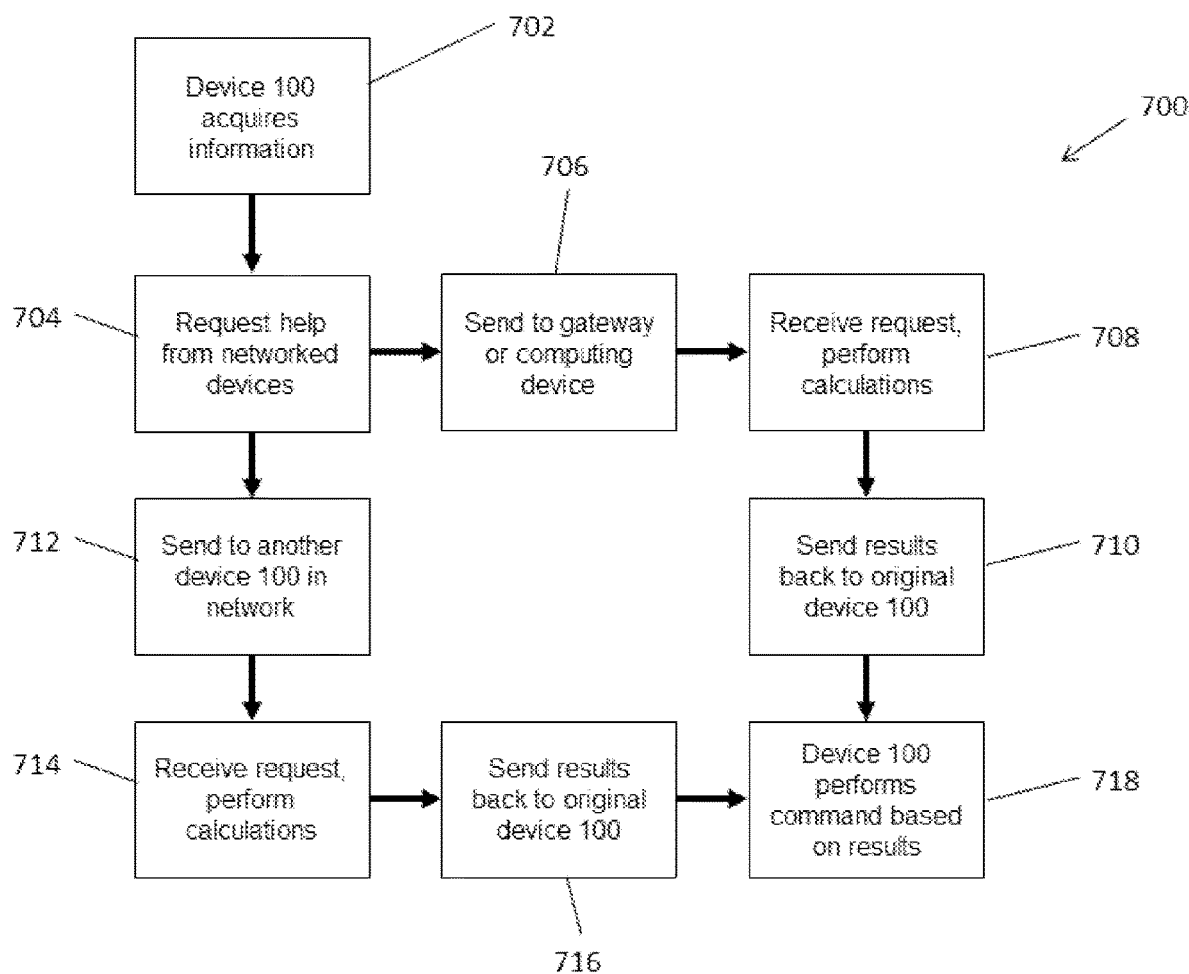
FIG. 14 is a process flow diagram illustrating a method of data sharing according to an embodiment of the present disclosure.

Referring to FIG. 14, an exemplary data sharing process 700 is illustrated. In block 702, a control device 100 may receive information in one or more methods described throughout this application. The information may be recorded in the form of computerized values known in the art and organized or stored in a digital log file.

The control device 100 may request computational operations from one or more devices in the network. Referring to block 704, the control device 100 may prepare to share the entire log file or part of the log file with devices configured to perform the necessary computational calculations. In some embodiments, data from the log file may be sent to more than one networked device. The same data may be sent to multiple devices to perform the same calculations to ensure accuracy and precision. Alternatively, different portions of the data set or log file may be sent to multiple devices so that each device receives only a portion of the calculation burden.

In block 706, the control device 100 may send information to a computing device 200 configured to interact with the network. The computing device 200, for example, a personal computer, a smart phone, or another suitable device as disclosed throughout the application, may be configured to receive information from one or more devices 100 and to perform the necessary calculations. The computing device 200 may be configured to use fewer resources. In some embodiments, the computing device 200 has more efficient consumption of energy, a greater reservoir of energy, or is configured to continuously draw more energy as needed (for example, from a power outlet). In some embodiments, the computing device 200 includes a gateway that is designed for implementation with the control device 100 and within the network.

Referring to block 708, the computing device 200 receives the request and the sent data and performs the necessary calculations. Calculations may include, for example, comparisons of parameters or ranking processes as described herein.

In block 710, the calculated results are communicated back to the original device that had sent the request. In some embodiments, the results may be transmitted directly to the requesting device 100. Alternatively, or additionally, the results may be sent to one or more intermediary devices for further relaying, calculations, and/or storage. In some embodiments, the intermediary device may be a computing device 200, a gateway device, or another control device 100.

The device 100 may additionally or alternatively send a calculation request to one or more separate control devices 100 within the network. Referring to block 712, a first (sending) control device 100 may send information to a second (receiving) control device 100 in a manner similar to that described in block 706 above.

In block 714, the receiving device 100 receives the data and the calculation request and performs the necessary calculations as described above, for example in block 708.

In block 716, the results of the calculation are communicated back to the original requesting device 100. In some embodiments, the results may be sent to one or more intermediary devices for further relaying, calculations, and/or storage. In some embodiments, the intermediary device may be a computing device 200, a gateway device, or another control device 100.

Referring to block 718, when the requesting device 100 receives the calculation results from one or more of the devices described above, the requesting device 100 may perform a command based on the results of the calculations.

It will be understood that, although the requesting device 100 may send data to external devices and request calculations to be performed, the requesting device 100 may also perform a part or the whole of the calculations itself.

The term "plurality," as used herein, means more than one. The singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

While the disclosure has been described in connection with the various embodiments of the various figures, it will be appreciated by those skilled in the art that changes could be made to the embodiments described above without departing from the broad inventive concept thereof. It is understood, therefore, that this disclosure is not limited to the particular embodiments disclosed, and it is intended to cover modifications within the spirit and scope of the present disclosure as defined by the claims.

Features of the disclosure that are described above in the context of separate embodiments may be provided in combination in a single embodiment. Conversely, various features of the disclosure that are described in the context of a single embodiment may also be provided separately or in any sub-combination. Finally, while an embodiment may be described as part of a series of steps or part of a more general structure, each said step may also be considered an independent embodiment in itself, combinable with others.

What is claimed:

1. A control device configured to control operation of a window covering, the control device comprising:
    a housing having an external surface, an internal surface, and an internal space defined by the internal surface;
    a rotatable adapter carried by the housing, the rotatable adapter being configured to engage a cord of the window covering;
    a motor operably coupled to the rotatable adapter and being contained within the internal space, the motor being configured to cause the rotatable adapter to rotate;
    at least one sensor; and
    a controller configured to, in response to a first at least one input, a) create a first ranking of preferences based on the first at least one input, b) create a second ranking of preferences based on the first at least one input, c) move a preference of the second ranking of preferences to the first ranking of preferences; the controller being further configured to, in response to a second at least one input, the second at least one input being from the at least one sensor, d) select one or more preferences from the first or second ranking of preferences, and e) actuate the motor to rotate the rotatable adapter based on the selected one or more preferences obtained from the respective first or second ranking of preferences, such that 1) when the rotatable adapter is engaged with the cord of the window covering and 2) the motor rotates, the window covering moves between a first configuration and a second configuration that is different than the first configuration.

2. The control device of claim 1, wherein the first at least one input is based on a user input of preferences or stored preferences.

3. The control device of claim 1, wherein the rotatable adapter includes a plurality of posts and the cord includes a plurality of recesses, wherein the recesses are configured to receive at least one of the plurality of posts.

4. The control device of claim 1, wherein the controller includes a processor that is configured to execute a command instruction to actuate the motor.

5. The control device of claim 4, wherein the command instruction includes a duration for which the motor is actuated.

6. The control device of claim 1, wherein the motor is configured to rotate the rotatable adapter in a first direction such that the window covering transitions from the first configuration toward the second configuration, and in a second direction such that the window covering transitions from the second configuration toward the first configuration.

7. The control device of claim 1, further comprising a communications element configured to communicatively couple to a computing device, wherein the motor is configured to be actuated by a command instruction received from the computing device via the communications element.

8. The control device of claim 1, wherein the at least one sensor is a light sensor configured to measure an intensity of light, wherein the controller is configured to, in response to input from the light sensor, cause the motor to rotate the rotatable adapter, such that when a) the rotatable adapter is engaged with the cord of the window covering and b) and the motor rotates, the window covering moves between the first configuration and the second configuration that is different than the first configuration.

9. The control device of claim 8, wherein the light sensor is a solar sensor that measures sun intensity and sun exposure duration.

10. The control device of claim 9, wherein the motor is configured to actuate in a first direction to move the window covering in a first configuration when light intensity is above a threshold value.

11. The control device of claim 1, further comprising a temperature sensor configured to collect temperature data, wherein the temperature sensor is configured to communicate with the controller.

12. The control device of claim 11, wherein the motor is configured to be actuated in response to the data collected by the temperature sensor.

13. A kit for operating a window covering, the kit comprising:
    1) a control device for operating a window covering, the control device having:
        a housing having an external surface, an internal surface, and an internal space defined by the internal surface;
        an adapter receptacle carried by the housing;
        a motor operably coupled to the rotatable adapter and being contained within the internal space, the motor being configured to cause the rotatable adapter to rotate;
        at least one sensor; and
        a controller configured to, in response to a first at least one input, a) create a first ranking of preferences based on the first at least on input, b) create a second ranking of preferences based on the first at least one input, c) move a preference of the second ranking of preferences to the first ranking of preferences; the controller being further configured to, in response to a second at least one input being from the at least one sensor, d) select one or more preferences from the first or second ranking of preferences, and e) actuate the motor to rotate the rotatable adapter based on the selected one or more preferences obtained from the respective first or second ranking of preferences, such that 1) when the rotatable adapter is engaged with the cord of the window covering and the motor rotates, the window covering moves between a first configuration and a second configuration that is different than the first configuration; and 2) a plurality of rotatable adapters, each of the rotatable adapters being configured to engage a cord of the window covering, the plurality of rotatable adapters being configured to interchangeably engage with the adapter receptacle.

14. The kit of claim 13, wherein the first at least on input is based on a user input of preferences or stored preferences.

15. The kit of claim 13, wherein the rotatable adapter includes a plurality of posts, and the cord includes a plurality of recesses, wherein the recesses are configured to receive at least one of the plurality of posts.

16. The kit of claim 13, wherein the controller includes a processor that is configured to execute a command instruction to actuate the motor.

17. The kit of claim 16, wherein the command instruction includes a duration for which the motor is actuated.

18. The kit of claim 13, wherein the motor is configured to rotate the rotatable adapter in a first direction such that the window covering transitions from the first configuration toward the second configuration, and in a second direction such that the window covering transitions from the second configuration toward the first configuration.

19. The kit of claim 13, further comprising a communications element configured to communicatively couple to a computing device, wherein the motor is configured to be actuated by a command instruction received from the computing device via the communications element.

20. The kit of claim 13, wherein the at least one sensor is a light sensor configured to measure an intensity of light, wherein the controller is configured to, in response to input from the light sensor, cause the motor to rotate the rotatable adapter, such that when a) the rotatable adapter is engaged with the cord of the window covering and b) the motor rotates, the window covering moves between the first configuration and the second configuration that is different than the first configuration.

21. A method of adjusting the configuration of a window covering for a window, the method comprising:
receiving a first at least one input and a second at least one input from a control device comprising a) a housing, an internal surface, and an internal space defined by the internal surface, b) a rotatable adapter carried by the housing, c) a motor operably coupled to the rotatable adapter and being contained within the internal space, d) at least one sensor, and e) a controller;
ranking a first list of preferences based on the first at least one input;
ranking a second list of preferences based on the first at least one input;
moving a preference from the first list of preferences to the second list of preferences based on the first at least one input;
in response to the second at least one input, wherein the second at least one input is from the at least one sensor, selecting one or more preferences from the ranking of the first or second list of preferences; and
actuating the motor based on the selected one or more preferences obtained from the ranking of preferences, such that the window covering transitions from a first configuration to a second configuration that is different than the first configuration.

22. The method of claim 21, further comprising the step of stopping actuation of the motor after a predetermined duration.

23. The method of claim 21, further comprising the steps of:
measuring at least one of sun intensity and sun exposure duration via a solar sensor; and
transmitting the measured data to the control device.

24. The method of claim 21, further comprising the steps of:
measuring temperature data with a temperature sensor; and
transmitting the temperature data to the control device.

25. The method of claim 21, further comprising transmitting scheduling data to the control device, wherein the scheduling data includes at least one of a time and date, the scheduling data being preprogrammed in a computing device having a clock and a calendar.

26. The method of claim 21, further comprising receiving a first input signal and a second input signal, such that in response to the first input signal, the motor is actuated to rotate the rotatable adapter such that the window covering transitions from the first configuration to the second configuration, and in response to the second input signal, the motor is actuated to rotate the rotatable adapter such that the window covering transitions from the second configuration to a third configuration different than the second configuration.

27. The method of claim 21, further comprising the step of saving the input signal to a memory of the control device.

28. The method of claim 21, further comprising a step of receiving an input signal from a switch actuated by a user.

* * * * *